Oct. 16, 1962       M. J. CORBETT              3,058,304
              STEERING CONTROL FOR ROCKET
Filed March 2, 1959                      4 Sheets-Sheet 3

Inventor
Marshall James Corbett
by Hill, Sherman, Meroni, Gross & Simpson Attys

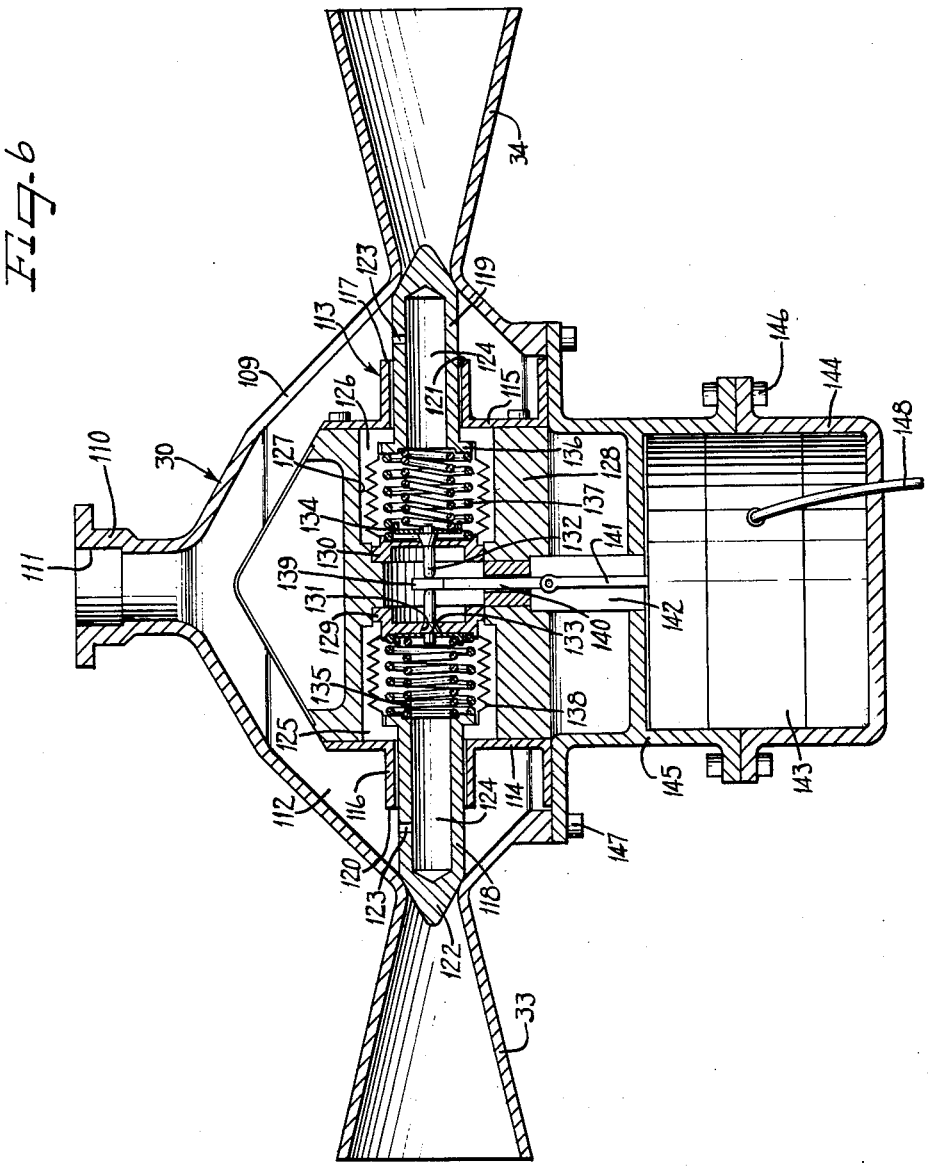

United States Patent Office 3,058,304
Patented Oct. 16, 1962

3,058,304
STEERING CONTROL FOR ROCKET
Marshall James Corbett, Cleveland, Ohio, assignor to Thompson Ramo Wooldridge Inc., Cleveland, Ohio, a corporation of Ohio
Filed Mar. 2, 1959, Ser. No. 796,311
6 Claims. (Cl. 60—35.55)

The present invention relates broadly to the art of rocket propulsion, and is more particularly concerned with a rocket engine featuring a single main thrust nozzle tiltable under action of gimbal means on the engine hot side to effect pitch and yaw control.

It has been the prior practice in the rocketry art to control the movements of roll, pitch and yaw by provision on the rocket engine of four circumferentially spaced nozzles, each independently pivotally mounted by the engine housing wall at the exhaust or hot end of the engine. By reason of the extremely high temperature to which the mounting means for each nozzle was subjected, it has only been possible to obtain pivotal or tiltable movement of each nozzle about a single axis. Accordingly, the four nozzles have been arranged with diametrally opposed nozzles tiltable about the same axis, or in other words, the tilting axis of the respective nozzles was off-set 90° in pairs. As can be appreciated, the four-nozzle system requires duplication of many of the operating mechanisms, and further, the system is not characterized by a high degree of reliability.

It is therefore an important aim of the present invention to provide a rocket engine wherein pitch and yaw control are reliably effected by a single main thrust nozzle.

Another object of this invention lies in the provision of a pitch and yaw control system for rockets and the like, featuring a single nozzle and gimbal means on the rocket engine hot side mounting the nozzle and tiltable about both a horizontal and vertical axis to accurately control pitch and yaw movements.

Another object of the invention is to provide a single nozzle rocket engine having a gimbal joint on the hot side thereof and actuated to tilt the same for pitch and yaw control, the engine additionally featuring auxiliary nozzle means to effect roll control of the rocket.

A further object of the present invention is to provide, in a rocket engine having a housing defining a combustion chamber and provided with a wall at the exhaust end thereof, a single main thrust nozzle extending outwardly from said wall, gimbal means connecting with the nozzle, actuating means connecting with the gimbal means for tilting the nozzle about both the horizontal and vertical axes to effect pitch and yaw control, and auxiliary nozzle means mounted by the wall controlling roll in the rocket engine.

Other objects and advantages of the present invention will become more apparent during the course of the following description, particularly when taken in connection with the accompanying drawings.

In the drawings, wherein like numerals are employed to designate like parts throughout the same:

FIGURE 6 is a sectional view through one of the roll control nozzles of FIGURE 1.

Briefly stated, the present invention features the provision of a single main thrust nozzle extending axially from the end wall defining the exhaust or hot side of the rocket engine, the neck portion of the nozzle being surrounded by a gimbal ring tiltable about the horizontal axis by rotation of shaft means of a hot gas actuator mounted on the engine end wall. A second actuator, which may be of the same character as the pitch control actuator, tilts the nozzle about a vertical axis for yaw control by connection with a trunnion mounting between the gimbal ring and nozzle neck portion. The actuators are driven by a suitable gas generator, and the generator further communicates with a pair of diametrally opposed roll control nozzles. Accordingly, upon ignition of the propellant, gas is directed by suitable lines to the gas actuators and roll control nozzles, and upon a signal being sent from the rocket autopilot system to the actuators or roll control nozzles, torque motors associated therewith cause an unbalance to be created and either the actuator shaft to be rotated or gas exhausted in a particular direction from the roll control nozzles. The single main nozzle may mount thrust reversal means, which may be clam shell members, and these may be rotated by a gas actuator of the same type driven by the gas generator. The structural features of the actuators and roll control nozzles will be brought out in detail, and further novel concepts of the invention will become apparent during the course of the description now to follow.

Figure 1:
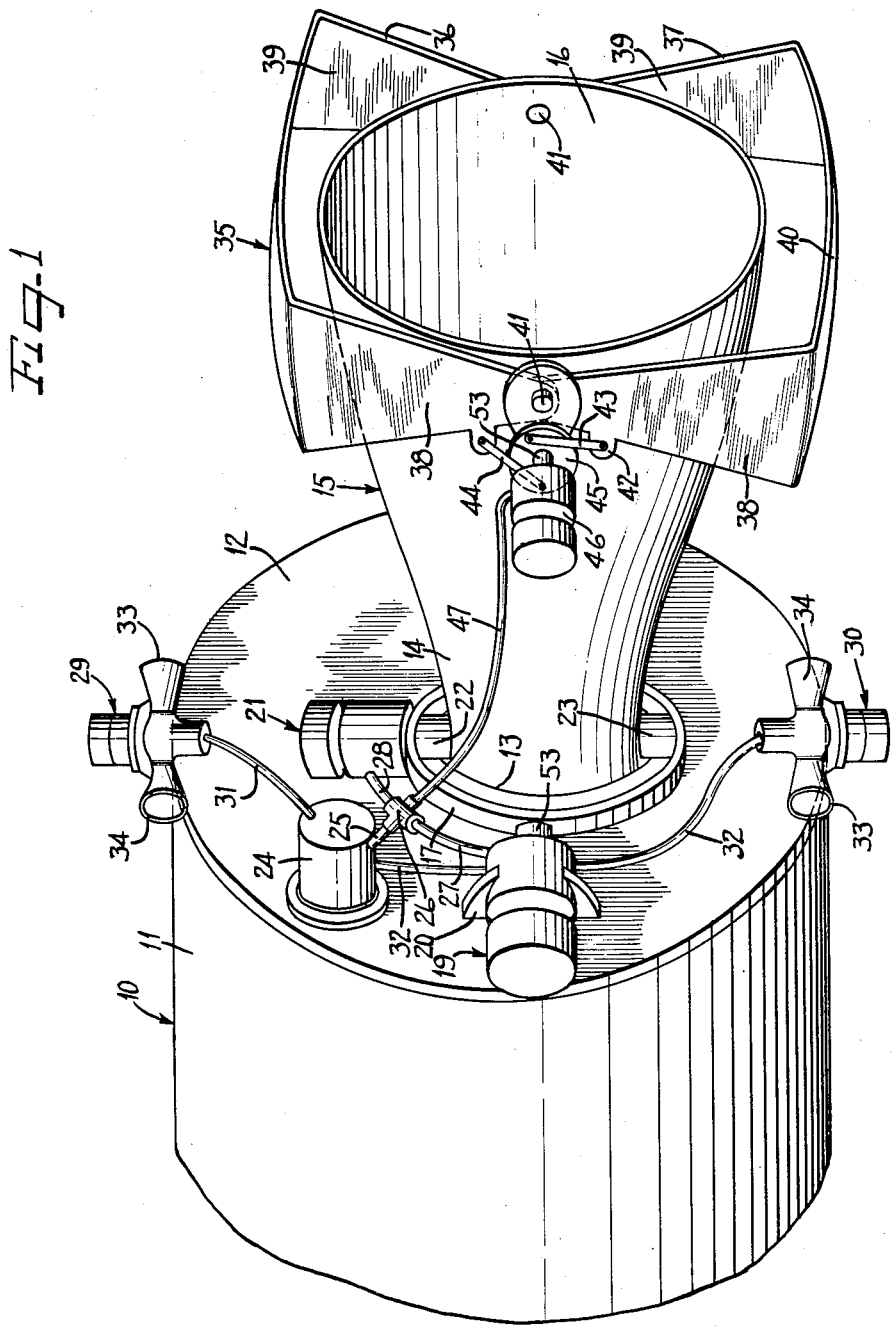
FIGURE 1 is a side elevational view of one end of the rocket engine and showing in somewhat diagrammatic form the pitch, yaw and roll control system of this invention.

Referring now first to FIGURE 1 of the drawings, there is shown the aft portion of a rocket engine 10 provided with a generally cylindrical housing 11 defining interiorly a combustion chamber and mounting at the exhaust end or hot side of the engine an end wall 12. The end wall is apertured generally centrally thereof, as indicated by the numeral 13, to freely receive therein neck portion 14 of a single main thrust nozzle 15, which may be of the general frusto-conical shape shown and provided with a relatively wide mouth or discharge portion 16.

The nozzle 15 tilts through an angle of about plus 5° and minus 5° with respect to the horizontal and vertical centerlines of the housing 11 by movement upon the portion of the end wall 12 surrounding the opening 13, and for this purpose the neck portion 14 of the nozzle 15 is surrounded in circumferentially spaced relation by a gimbal ring 17. To effect tiltable movement about the horizontal axis for pitch control, the gimbal ring 17 connects a rotatable shaft 53 of actuator means 19 attached by flange means 20 to the housing end wall 12. The actuator means 19 is preferably a hot gas servo and the structural details thereof will be specifically later described in connection with FIGURES 2, 3 and 4.

Yaw control, on the other hand, is accomplished by utilization of actuator means 21, preferably of the same character as the actuator means 19. The actuator 21 is supported by the gimbal ring 17 at a location spaced circumferentially about 90° from the shaft connection 53 of the actuator 19 with the gimbal ring 17. The actuator 21 mounts a shaft (not shown) of the same character as the shaft 53 of the actuator 19, and the shaft of said actuator 21 connects with a stub shaft 22 rigid with the nozzle neck portion 14 and rotatable with respect to the gimbal ring 17. At a diametrally opposed location the nozzle neck portion 14 there is provided a second stub shaft 23 which rotates upon the inner diameter of the gimbal ring 17 and is suitably secured to the nozzle neck portion 14. If desired, the stub shaft 22 may be replaced by the rotatable shaft of the actuator 21.

To drive the actuators 19 and 21 to tilt the gimbal ring 17 and nozzle 15 for pitch control, or to rotate the nozzle 15 when yaw control is required the rocket engine 10 is provided with gas generator means 24 in the form of a tank supported by the end wall 12 of the housing 11. The gas generator tank 24 houses a propellant which preferably is of the solid type and experience to date indicates that a nitroguanadine type base composition is the most desirable. The use of a gas generator 24 solely for the purpose of driving the actuators 19 and 21, and for the purposes later to be described of effecting roll control and actuation of thrust reversal means, is considered to have important advantages over the use of the main propellant charge for these purposes. First, the gas servo or actuator pressures can be a factor of three higher than the usually available rocket combustion chamber pressure, which is generally of the order of about 500 p.s.i.a. This means that the system's stiffness is equally better, and the gas actuator is about one-third the size and weight. Accordingly, a net weight saving is effected when a relatively small separate high pressure gas generator 24 is employed. Second, the actuators herein employed have relatively small internal flow passages, necessitating absolute cleanliness of the gases used to operate the actuators. Gases from the main propellant charge frequently contain either solid or liquid oxides, and these could well have a deleterious effect upon the actuator operation. Third, the temperature of the gases from a separate gas generator 24 may be about 4000° F. cooler than the main propellant gases. While diluents could of course be added to the main propellant gases, the weight and complexity of diluent systems is substantially greater than a relatively cool (1200° F.) burning gas generator 24.

The propellant contained in the gas generator 24 may be ignited in any suitable manner, and ignition means of the squib type may be employed for this purpose. To direct the gases from the generator 24 to the actuators 19 and 21, a main conduit or connection 25 is provided, connecting with a four-way member 26 from which connections 27 and 28 are taken to the actuators 19 and 21, respectively.

Supported by the end wall 12 of the housing 11 at diametrically opposed locations and essentially in alignment with the vertical axis of the housing 11 is a pair of roll control nozzle means 29 and 30. The structural details of these nozzles appear in FIGURE 6, and a detailed description thereof will be later made. The roll control nozzles 29 and 30 function under action of gases directed thereto by connections 31 and 32 from the gas generator 24, and as will be later described, a signal from the rocket autopilot system causes gases to be directed outwardly from either of the discharge portions 33 or 34 of the nozzles 29 and 30 to effect roll control.

Figure 5:
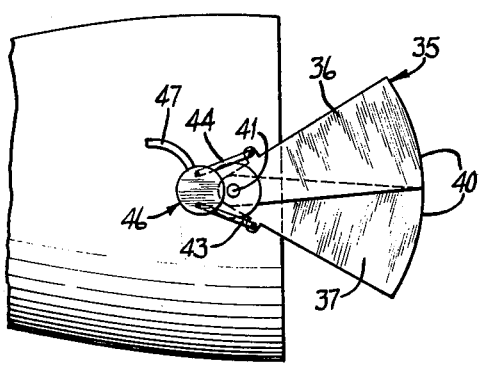
FIGURE 5 is a side elevational view of a portion of the single main thrust nozzle, showing thrust reversing means in an essentially closed position.

In accordance with the principles of this invention, there may further be provided in association with the single main thrust nozzle 15 thrust reversal means generally indicated by the numeral 35. Such means may comprise a pair of clam shell members 36 and 37, each being provided with a pair of spaced generally flat side wall portions 38 and 39 connected by a curved arcuate end portion 40. Each side portion of the clam shell members is apertured adjacent its inner end for receival upon pin means 41, and outwardly of the pin means each side portion 38 is formed with an ear 42 to which is connected a link arm 43—44 pinned or otherwise secured to a circular disc 45. The disc member 45 connects with a shaft 53 on actuator means 46, which preferably is constructed identically with the actuator means 19 and 21 employed for pitch and yaw control. The actuator means 46 receives a conduit 47 leading to the four-way connection 26 and the gas generator 24. The actuator 46, and the actuators 19 and 21, are suitably electrically connected to the rocket autopilot system so that a signal received therefrom causes rotation of the actuator shaft 53 and corresponding rotation of the disc member 45 to move the clam shell members 36 and 37 into an open or closed position. Specifically, clockwise rotation of the shaft 53 and disc member 45 translates the link arms 43 and 44 to move the clam shell members 36 and 37 from their open position of FIGURE 1 to their closed position of FIGURE 5, whereat the link arms 43 and 44 are extended rearwardly and the end portions 40 of the clam shell members 36 and 37 essentially abut one another along their rearward edges. The clam shell members when extended as in FIGURE 5 are in generally a full thrust reversal position, although of course the clam shell members may be controllably moved to one or more positions intermediate that of FIGURE 1 and FIGURE 5. As is also apparent, suitable stop means in the form of abutment blocks or the like may be provided on the nozzle 15 to limit the extent of opening movement of said members.

It is to be seen from the foregoing description that there is herein provided a gimbal jointed hot nozzle accurately controllable by gas actuator means to effect pitch and yaw control, and further including auxiliary control jets for controlling the movement of roll. As was earlier noted, prior known rocket engines have been equipped with four nozzles to control roll, pitch and yaw of the rocket. The pivots for the nozzles could only accommodate pivoting in one plane because of the high temperature conditions in which they operate. The tilting axis of the respective nozzles was therefore off-set 90° in pairs. In contrast therewith, the present development utilizes a full gimbal joint for the rocket engine nozzle, and provides pitch and yaw control with a single nozzle. Roll is controlled, on the other hand, by the use of relatively small nozzles 29 and 30. Since only a single main thrust nozzle is required in accordance with the principles of this invention, clam shell thrust reversers can be provided on the nozzle, as described in the preceding paragraph. Such reversers could not be used in the past in multiple-stage devices, for the reason that no escape path for the gases was provided therein.

Figure 2:
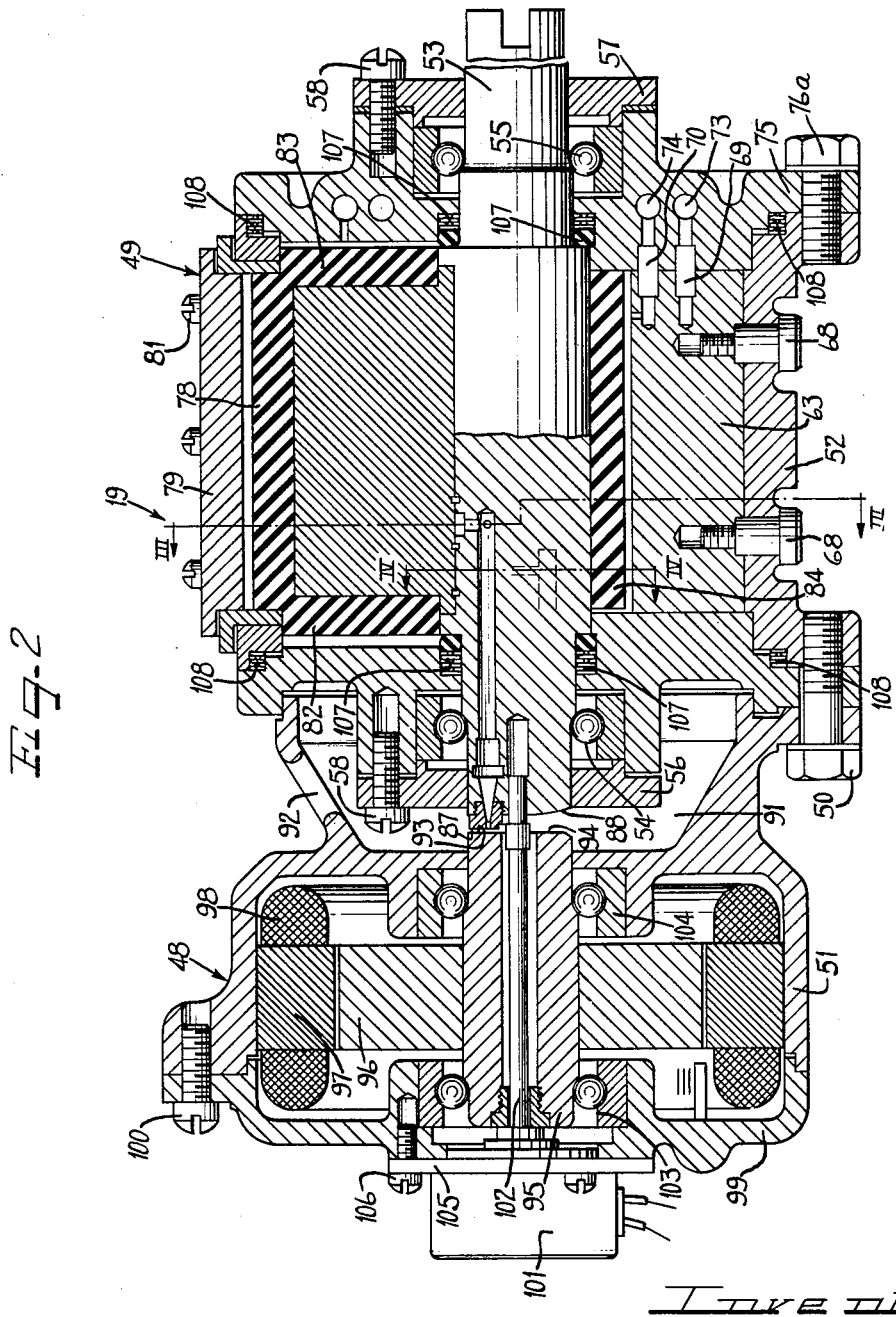
FIGURE 2 is a sectional view of a preferred form of actuator means for tilting the thrust nozzle.
Figure 3:
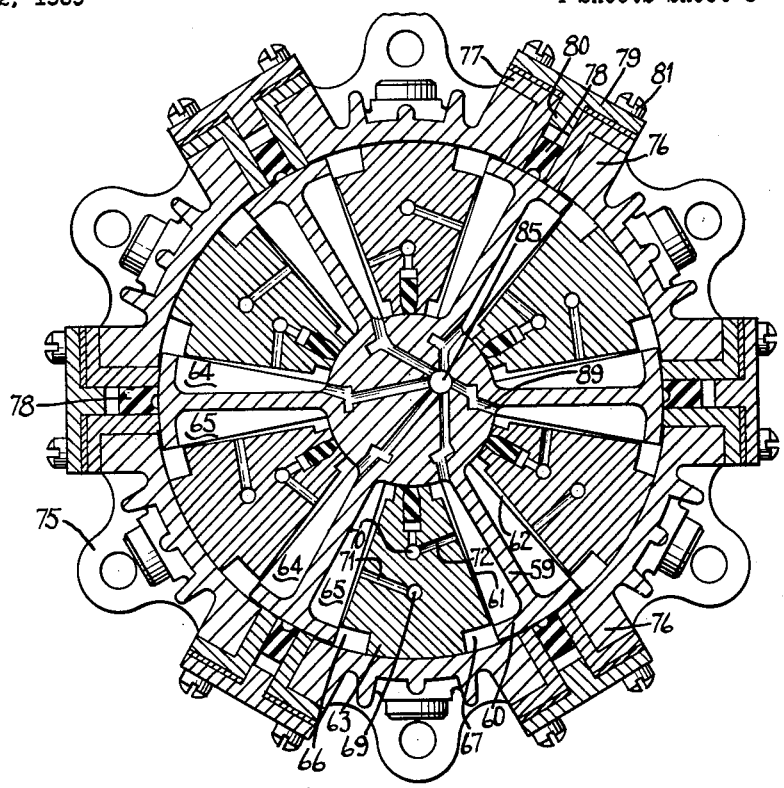
FIGURE 3 is a sectional view taken through the rotary section of the actuator means of FIGURE 2.
Figure 4:
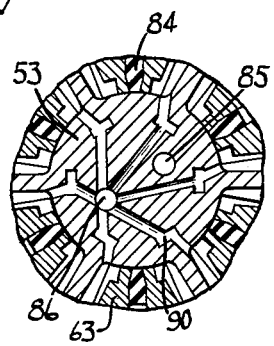
FIGURE 4 is a fragmentary detail sectional view of the actuator shaft to show more clearly a second set of inlet and outlet fluid passages therein.

As noted, the actuator means 19, 21 and 46 are desirably identical in construction, and the structural details of a preferred form of hot gas actuator are shown in FIGURES 2, 3 and 4, to which reference is now made. The actuator assembly 19 comprises a torque motor portion 48 and actuator portion 49 connected one to the other by bolt means 50 engageable with torque motor housing 51 and actuator housing 52. Extending axially within the actuator housing 52 is an actuator shaft 53 supported inwardly of opposite ends by bearing means 54 and 55, which preferably are of the preloaded angular contact type, in order to allow for relative radial growth of the housing and shaft, and still provide accurate concentricity of the rotating and stationary assemblies. The bearing means are maintained in position by abutment with plate members 56 and 57, respectively, bolted as at 58 to opposite ends of the actuator housing 52.

Inwardly of its opposite ends the actuator shaft 53 has Nicro-brazed or otherwise secured thereto six radially extending vanes 59 each formed with an end portion or web 60 thereon and rotatable between adjacent surfaces 61 and 62 of six stationary abutment blocks 63. The surfaces 61 and 62 in cooperation with each vane 59 define a pair of vane chambers 64 and 65. It is to be seen from FIGURE 3 that each abutment block 63 is notched or grooved axially at a pair of circumferentially spaced locations 66 and 67 for receiving the web portion 60 of each vane 59 during rotation in either a clockwise or counter-clockwise direction upon rotation of the actuator shaft 53.

Each stationary abutment block 63 receives bolt means or the like 68 securing the same to the actuator housing 52, and each block 63 is provided with a pair of radially spaced and axially extending passages 69 and 70 connecting therein with a pair of transverse passages 71 and 72, respectively, the passage 71 directing hot gas to the chamber 65 and the passage 72 leading to the vane chamber 64.

The axially extending passages 69 and 70 in each abutment block 63 communicate with axially extending passages 73 and 74 in cover member 75 attached by bolt means or the like 76a to the actuator housing 52. Suitable connections are of course made from the axial passages 73 and 74 in the cover member 75 to the conduit means 27, 28 or 47 leading from the gas generator 24 of FIGURE 1.

Radially outwardly of the vanes 59 the outer diameter of the housing 52 is formed with a plurality of circumferentially spaced raised portions 76 (FIGURE 3) passaged to receive sleeve means 77 suppotring seal means 78 in rubbing contact with the web portion 60 of each vane 59. Each raised portion 76 on the housing outer diameter receives cap means 79 which may be shaped with an inwardly extending tongue portion 80 closing the seal chamber, the cap means 79 being screwed or otherwise secured as at 81 to the housing raised portions 76. The seal means 78 may be of the pressure loaded carbon type, and as shown in FIGURE 2, similar seals 82 and 83 are provided at opposite ends of each vane 59, and additional seal means 84 are housed in suitable recesses extending axially along the radially inwardly directed portions of each of the abutment blocks 63. It is thus to be seen that the vane chambers 64 and 65 defined between adjacent surfaces 61 and 62 of the abutment blocks 63 and the vane 59 are essentially surrounded by the seal means 78, 82, 83 and 84, and hot gas leakage therefrom effectively precluded.

The actuator shaft 53 is provided with a pair of radially spaced and axially extending exhaust passages 85 and 86 terminating in suitably cammed surfaces 87 and 88, respectively, on one end of said shaft. As appears in FIGURES 2 and 3, the axial passage 85 communicates with generally radially extending passages 89 in the actuator shaft 53, the radial passages 89 exhausting hot gas from the vane chamber 64, while as best shown in FIGURE 4, the axial passage 86 in the shaft 53 connects with radially extending passages 90 exhausting each of the vane chambers 65. It is thus to be seen that hot gas entering each vane chamber 64 through the axial passage 74 in the cover member 75 and into the axial passage 70 in the abutment block 63 and through the transverse passage 72 communicating therewith is exhausted through one of the radial passages 89 into the axial passage 85 in the shaft 53 and outwardly therefrom at the cam surface 87 at one end of said shaft. Similarly, each vane chamber 65 receives hot gas through the passages 73, 69, and 71, the gas from said chamber 65 being exhausted through one of the radial passages 90 in the actuator shaft 53, the radial passages 90 connecting with the axial passage 86 in said shaft which terminates at the cam surface 88 thereof. Each of the axial passages 85 and 86 are in communication with an annular chamber 91 defined by housings 51 and 52 of the torque motor 48 and actuator 49, the chamber 91 exhausting to ambient through an aperture 92 therein.

As is also shown in FIGURE 2, the cam surfaces 87 and 88 on the actuator shaft 53 are in close relation with cam surfaces 93 and 94 on torque motor shaft 95. When the torque motor 48 and actuator 49 are in phase with respect to one another the cam surfaces 93 and 94 on the torque motor shaft 95 release gas from the axial passages 85 and 86 in the actuator shaft 53 at identical rates. However, when the torque motor shaft 95 is caused to rotate by a signal from the rocket autopilot system, either of the cam surfaces 93 or 94 on the torque motor shaft 95 blocks one of the axial passages 85 or 86 in the actuator shaft 53 ahead of the direction of rotation, and opens the exhaust area behind the direction of rotation. This results in rotation of the actuator shaft 53 due to a pressure unbalance in the vane chambers 64 and 65, which unbalance continues until the vane 59 is rotated by pressure building up in either of the chambers 64 and 65, whereupon the cam surfaces on the torque motor shaft and actuator shaft are in equal bleed-out orifice gap relation and the torque motor 48 is again in phase therewith.

The torque motor 48 is preferably a reversible electric motor of the two phase induction type having a squirrel cage armature 96 rotatable within a stator 97 having windings 98 thereon. The torque motor housing 51 may mount a cover member 99 by bolt means or the like 100, and carried by the cover member 99 may be a feedback potentiometer 101 driven by a relatively small quill shaft 102 extending axially within the torque motor shaft 95 and received in one end of the actuator shaft 53 for rotation therewith. The torque motor shaft 95 may be mounted in bearing means 103 and 104 of the same character as the bearing means 54 and 55 mounting the actuator shaft 53. The potentiometer 101 may be angularly indexed in order to zero-in the potentiometer's null to the zero deflection position of the single main thrust or vector nozzle 15 of FIGURE 1. This may be accomplished by adjustment of a plate member 105 supporting the potentiometer 101 and mounted by the torque motor cover member 99 by screws or the like 106. Although not specifically described hereinabove, the actuator 49 is made essentially completely gas tight by utilization of suitable seal means throughout, and such means may include bellows shaft seals 107 contacting the actuator shaft 53 adjacent the vane chambers 64 and 65, and similar bellows seal means 108 inwardly of the bolt means 50 and 76a securing the torque motor housing 51 to the actuator housing 52 and the actuator housing cover member 75 to the actuator housing 52.

Referring now to FIGURE 6, there is shown a preferred structural embodiment of roll control nozzle 29 or 30 constructed in accordance with the principles of this invention. The nozzles 29 and 30 are identical, and accordingly the description now to follow is applicable to both units 29 and 30. The nozzle means 30 comprises a housing 109 shaped to provide a pair of outwardly extending generally conical nozzle members 33 and 34 and an inlet neck or mouth portion 110 defining a gas inlet passage 111 communicating with the conduit means 32 leading to gas generator 24. The housing 109 defines interiorly thereof a chamber 112 and mounted within said chamber is a valve assembly generally designated by the numeral 113.

The valve assembly generally designated as 113 comprises a pair of spaced end wall members 114 and 115 provided with axially extended annular collar portions 116 and 117 radially spaced from and coaxial with a pair of axially movable valve members 118 and 119 to provide therebetween an annular gas flow passage 120 and 121 in communication with the chamber 112 and inlet passage 111 thereto. The valve members 118 and 119 are seen to be generally cylindrical in shape and provided with a conical end portion 122 for sealing contact with the inner walls of the housing 109 to open and close the passage between the chamber 112 and the discharge nozzles 33 and 34. Each valve member 118 and 119 is apertured at 123 to provide communication between the chamber 112 and bore 124 of each valve member.

The annular passages 120 and 121 between the valve members and annular collar portions 116 and 117 communicate with a pair of chambers 125 and 126 defined by a stepped bore 127 in valve assembly body member 128 suitably attached to the end wall members 114 and 115. Seated within the bore 127 is a pair of spaced plate members 129 and 130 each provided with a countersunk opening 131 receiving pin means 132 having a frusto-conical portion 133 formed thereon bearing against a centrally apertured disc member 134 bottoming one end of spring means 135 which bottoms at its opposite end against a shoulder 136 formed on the base of each valve member 118 and 119. The shoulder 136 further bottoms spring means 137 provided interiorly of bellows means 138 attached at opposite ends to the shoulder 136 and to the plate member 129. The bellows spring 137 bottoms at its opposite end against the plate member 129 or 130.

The pin means 132 are caused to travel axially one at a time by provision of a camming surface 139 on a lever member 140 tiltable by a connecting member 141 extending axially within a shaft 142 of a torque motor 143. The torque motor 143 is housed within body portions 144 and 145 connected by bolt means or the like 146, the annular body portion 145 being secured to the nozzle main body portion 109 by screws or the like 147. The torque motor 143 is caused to rotate by an electrical signal from the rocket autopilot system, and an electrical connection 148 thereto is provided for this purpose. The torque motor 143 may be of the same general character as the torque motor 48 described in connection with FIGURE 2, or other forms may be employed as desired.

Upon ignition of the propellant contained in the generator 24 of FIGURE 1, hot gas continuously flows through the conduit means 32 to the inlet passage 111 of the roll control nozzle 30, and similarly through the conduit 31 to the inlet passage of the roll control nozzle 29. This hot gas flows both through the aperture 123 in each valve member 118 and 119 and also through the annular passage 120 and 121 surrounding said valve members 118 and 119. The gas pressures exert an axial force against the valve members interiorly thereof within the bore 124 in each, and said pressures are aided by the bellows spring means 137 to maintain the valve members 118 and 119 in their closed positions of FIGURE 6. However, when an electrical signal is received by the torque motor 143 through the connection 148 to the rocket autopilot system the lever arm 140 is tilted and by action of the raised cam surfaces 139 thereon, one of the pin means 132 is caused to move axially opening the aperture 131 in one of the plate members 129 or 130 porting to the chamber between said plate members gas pressures within the valve member bore 124. Gas pressures travelling through the annular passage 120 or 121 surrounding either of the valve members 118 or 119 thereupon exert a sufficient action upon the outer face of the shoulder 136 on either of the valve members, to cause axial movement of the conical end portion 122 of either valve member to open the passage from the chamber 112 to either of the nozzles 33 or 34. Ultimately pressure again builds up within the valve member bore 124, and together with the force of the bellows spring means 137, the valve member 118 or 119 is caused to close. During this action, however, the followup spring 135 acts to return the pin means 132 to an aperture closing position. It is of course appreciated that only one of the nozzle members 33 or 34 ports exhaust gases at a particular moment, and the torque motors 143 of the roll control nozzles 29 and 30 are reversed so that thrust is provided in the same direction to rotate the rocket. As for example, to roll the rocket in a clockwise direction, the nozzle member 34 of each roll control nozzle 29 and 30 exhausts hot gases in the manner described in connection with FIGURE 6.

It is to be seen from the foregoing that applicant has provided a new and improved rocket engine featuring a single main thrust nozzle tiltable under action of gimbal means on the engine hot side to effect pitch and yaw control, and auxiliary control jets for controlling the movement of roll. There is thus eliminated the prior art requirement of four nozzles to control roll, pitch and yaw of the rocket, and further, by provision of only a single means thrust nozzle, clam shell thrust reversers of essentially the character shown in FIGURE 1 can be provided. Heretofore, as noted, such reversers could not be used in multiple-stage nozzle devices because no escape path for the gases can be provided.

This application is related to my copending application Serial No. 796,556 directed particularly to the roll control nozzles 29 and 30, and is also related to my copending application Serial No. 796,557 more especially concerned with the actuator means 19, 21 and 46.

While a preferred embodiment of the invention is shown in FIGURE 1, it is immediately apparent that variations and modifications may be effected therein without departing from the novel concepts of the present invention.

I claim as my invention:

1. In a rocket engine having a housing defining a combustion chamber, a wall at the exhaust end thereof provided with an opening generally centrally therein, and a single propulsion thrust nozzle extending rearwardly from the wall and having a neck portion received in said opening, the improvement which comprises: a gimbal ring spaced rearwardly from said wall and pivotally supported thereon for tilting about a first tilt axis, and surrounding said neck portion of said nozzle; a first hot gas rotary actuator disposed rearwardly of and mounted by said wall, and drivingly connected to said gimbal ring coaxially with its tilt axis for tilting said nozzle about said first tilt axis for control of a first engine attitude; pivot means, between said gimbal ring and said nozzle neck portion pivotable about a second tilt axis transverse to said first tilt axis, and supporting said nozzle; and a second hot gas rotary actuator disposed rearwardly of said wall and supported by said gimbal ring and drivingly connected to said pivot means coaxially with its tilt axis for tilting said nozzle about said second tilt axis for control of a second engine attitude.

2. In a rocket engine having a housing defining a combustion chamber, a wall at the exhaust end thereof provided with an opening generally centrally therein, and a single propulsion thrust nozzle extending rearwardly form the wall and having a neck portion received in said opening, the improvement which comprises: a gimbal ring spaced rearwardly from said wall and pivotally supported thereon for tilting about a first tilt axis, and surrounding said neck portion of said nozzle; a first hot gas rotary actuator disposed rearwardly of and mounted by said wall, and drivingly connected to said gimbal ring coaxially with its tilt axis for tilting said nozzle about said first tilt axis for control of a first engine attitude; pivot means, between said gimbal ring and said nozzle neck portion pivotable about a second tilt axis transverse to said first tilt axis, and supporting said nozzle; and gas generating means connected to said hot gas rotary actuators for supplying hot gas thereto, said generating means being constructed to be operative on fuel other than the type used in said combustion chamber.

3. In a rocket engine having a housing defining a combustion chamber, a wall at the exhaust end thereof provided with an opening generally centrally therein, and a single propulsion thrust nozzle extending rearwardly from the wall and having a neck portion received in said opening, the improvement which comprises: a gimbal ring spaced rearwardly from said wall and pivotally supported thereon for tilting about a first tilt axis, and surrounding said neck portion of said nozzle; a first hot gas rotary actuator disposed rearwardly of and mounted by said wall, and drivingly connected to said gimbal ring coaxially with its tilt axis for tilting said nozzle about said first tilt axis for control of a first engine attitude; pivot means, between said gimbal ring and said nozzle neck portion pivotable about a second tilt axis transverse to said first tilt axis, and supporting said nozzle; and a pair of valved control nozzles mounted by said housing along said end wall at diametrally opposed locations, said control nozzles comprising the sole means to provide thrust for roll control.

4. In a rocket engine having a housing defining a combustion chamber, a wall at the exhaust end thereof provided with an opening generally centrally therein, and a single propulsion thrust nozzle extending rearwardly from the wall and having a neck portion received in said opening, the improvement which comprises: a gimbal ring spaced rearwardly from said wall and pivotally supported thereon for tilting about a first tilt axis, and surrounding said neck portion of said nozzle; a first hot gas rotary actuator disposed rearwardly of and mounted by said wall, and drivingly connected to said gimbal ring coaxially with its tilt axis for tilting said nozzle about said first tilt axis for control of a first engine attitude; pivot means, between said gimbal ring and said nozzle neck portion pivotable about a second tilt axis transverse to said first tilt axis, and supporting asid nozzle; and a pair of valved control nozzles mounted by said housing along said end wall at diametrally opposed locations substantially aligned with said second tilt axis, said control nozzles comprising the sole means to provide thrust for roll control.

5. In a rocket engine having a housing defining a combustion chamber, a wall at the exhaust end thereof provided with an opening generally centrally therein, and a single propulsion thrust nozzle extending rearwardly from the wall and having a neck portion received in said opening, the improvement which comprises: a gimbal ring spaced rearwardly from said wall and pivotally supported thereon for tilting about a first tilt axis, and surrounding said neck portion of said nozzle; a first hot gas rotary actuator disposed rearwardly of and mounted by said wall, and drivingly connected to said gimbal ring coaxially with its tilt axis for tilting said nozzle about said first tilt axis for control of a first engine attitude; pivot means, between said gimbal ring and said nozzle neck portion pivotable about a second tilt axis transverse to said first tilt axis, and supporting said nozzle; and thrust reversal means supported by said tiltable nozzle adjacent the discharge end thereof and swingable to a position in the exhaust gas stream.

6. In a rocket engine having a housing defining a combustion chamber, a wall at the exhaust end thereof provided with an opening generally centrally therein, and a single propulsion thrust nozzle extending rearwardly from the wall and having a neck portion received in said opening, the improvement which comprises: a gimbal ring spaced rearwardly from said wall and pivotally supported thereon for tilting about a first tilt axis, and surrounding said neck portion of said nozzle; a first hot gas rotary actuator disposed rearwardly of and mounted by said wall, and drivingly connected to said gimbal ring coaxially with its tilt axis for tilting said nozzle about said first tilt axis for control of a first engine attitude; pivot means between said gimbal ring and said nozzle neck portion pivotable about a second tilt axis transverse to said first tilt axis, and supporting said nozzle; a pair of valved control nozzles mounted by said housing along said end wall at diametrally opposed locations substantially aligned with said second tilt axis, said control nozzles comprising the sole means to provide thrust for roll control; thrust reversal means supported by said tiltable nozzle adjacent the discharge end thereof and swingable to a position in the exhaust gas stream, said thrust reversal means including a third hot gas rotary actuator; and gas generating means connected to said hot gas rotary actuators and to said control nozzles for suuplying hot gas thereto, said generating means being constructed to be operative on fuel other than the type used in said combustion chamber.

References Cited in the file of this patent
UNITED STATES PATENTS

| | | |
|---|---|---|
| 2,469,660 | Martin | May 10, 1949 |
| 2,551,372 | Haltenberger | May 1, 1951 |
| 2,613,497 | MacDonald | Oct. 14, 1952 |
| 2,723,528 | Stark et al. | Nov. 15, 1955 |
| 2,868,478 | McCloughy | Jan. 13, 1959 |
| 2,919,546 | David | Jan. 5, 1960 |

FOREIGN PATENTS

| | | |
|---|---|---|
| 879,835 | France | Dec. 10, 1942 |
| 610,143 | Great Britain | Oct. 12, 1948 |

OTHER REFERENCES

Bell: "Compact Accessory Power," Aviation Age Magazine, Vol. 28, No. 3, pages 30–41, September 1957.

Stambler: "Small Engines Key to ICBM Accuracy"; Space/Aeronautics Magazine, October 1958, pages 30–31.